United States Patent [19]

Cage

[11] Patent Number: 4,768,385

[45] Date of Patent: Sep. 6, 1988

[54] PARALLEL PATH CORIOLIS MASS FLOW METER

[75] Inventor: Donald R. Cage, Longmont, Colo.

[73] Assignee: Micro Motion, Inc., Boulder, Colo.

[21] Appl. No.: 896,364

[22] Filed: Aug. 13, 1986

[51] Int. Cl.$^4$ .............................................. G01F 1/84
[52] U.S. Cl. ............................... 73/861.38; 285/137.1
[58] Field of Search ......................... 73/861.37, 861.38; 285/137.1, 175, 176, 155

[56] References Cited

U.S. PATENT DOCUMENTS

| | | | |
|---|---|---|---|
| 3,944,261 | 3/1976 | Reed et al. | 285/137.1 X |
| 4,491,025 | 1/1985 | Smith et al. | 73/861.38 |
| 4,557,261 | 12/1985 | Rugheimer | 285/155 X |
| 4,655,089 | 4/1987 | Kappelt et al. | 73/861.38 |

FOREIGN PATENT DOCUMENTS 517585 2/1953 Belgium .

Primary Examiner—Herbert Goldstein
Attorney, Agent, or Firm—John Victor Pezdek; Peter L. Michaelson

[57] ABSTRACT

A parallel path Coriolis mass flow rate meter, which incorporates improved inlet and outlet manifolds, is disclosed. Each manifold includes a transition piece and a tube mounting block. The transition piece incorporates a passageway to route fluid into or out of the meter and has a gradually changing cross-sectional area to reduce cavitation. Each tube mounting block has one end fixedly attached to a respective one of the transition pieces. The other end of the tube mounting blocks receives the parallel flow tubes. One mounting block evenly divides incoming fluid whose mass flow rate is to be determined between the parallel flow tubes while the other mounting block combines the fluid discharged from the flow tubes. Each of the tube mounting blocks is fabricated with an internal shoulder which aligns each of the flow tubes in a parallel relationship to one another and then suitably melts upon application of heat to maintain this relationship. The mounting blocks and transition pieces also incorporate various mechanical configurations which facilitate assembly of the meter and advantageously reduce the cost of the meter.

20 Claims, 4 Drawing Sheets

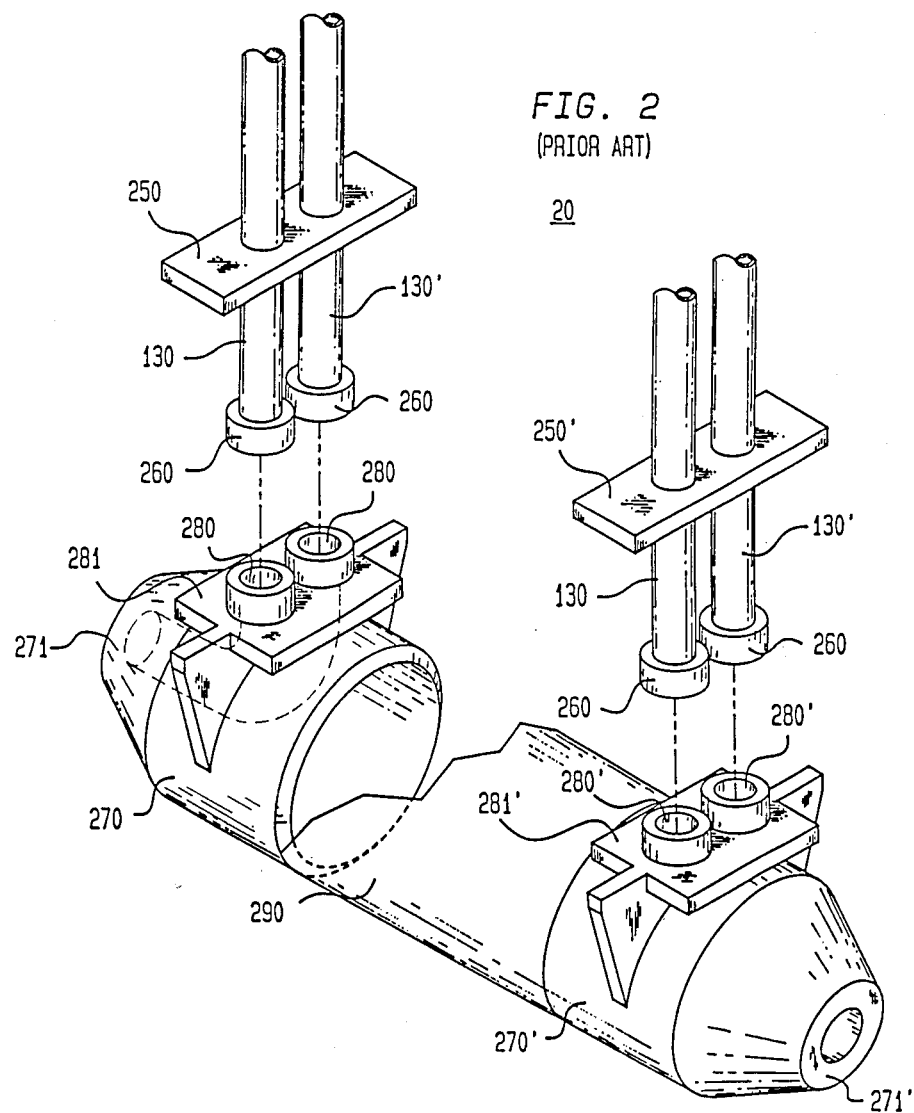

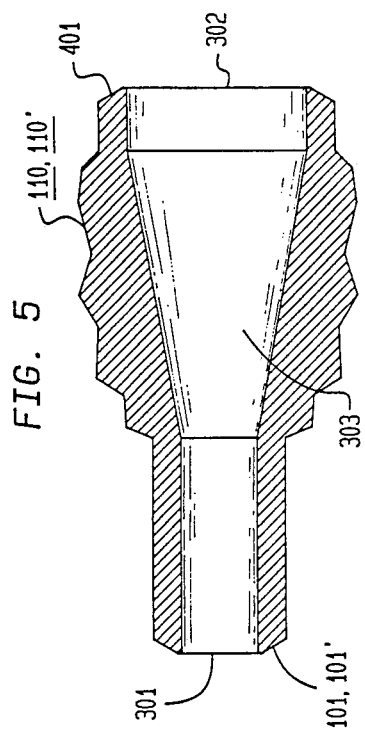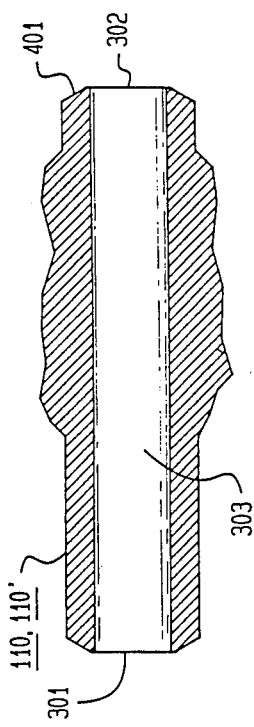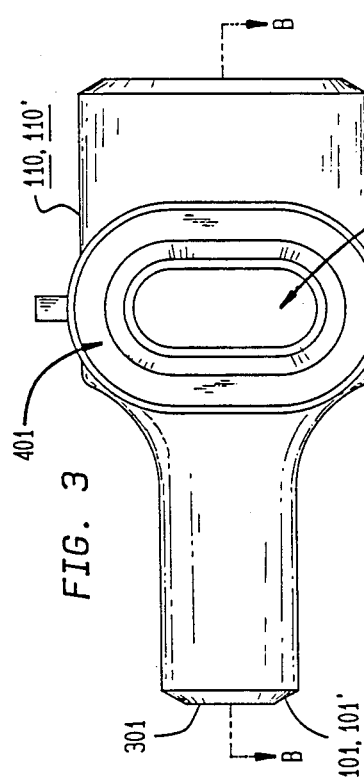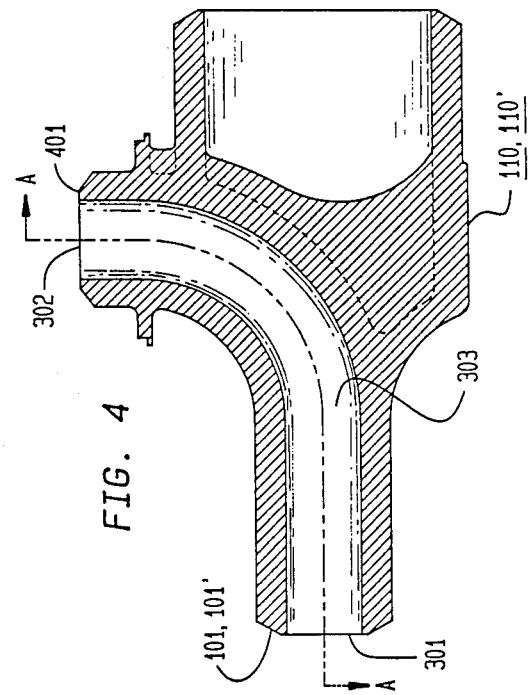

PARALLEL PATH CORIOLIS MASS FLOW METER

BACKGROUND OF THE INVENTION

1. Field of the Invention

The present invention relates to apparatus for a parallel path Coriolis mass flow mass meter and, more particularly, to such a mass flow meter which is easier to fabricate and which has improved measurement accuracy than prior art designs.

2. Description of the Prior Art

The art of mass flow rate measurement teaches that when a fluid flows through a rotating or oscillating conduit Coriolis forces are produced which are perpendicular to both the velocity of the fluid moving through the conduit and the angular velocity of the rotating or oscillating conduit. The magnitude of these Coriolis forces is proportional to the product of the mass flow rate and the angular velocity of the conduit. Meters which make use of this phenomenon are termed Coriolis mass flow rate meters.

In general, Coriolis forces that appear in these mass flow rate meters are rather small. Consequently, sensitive and precise instrumentation was often employed in early Coriolis mass flow meters in order to accurately measure the small Coriolis force effects, such as conduit deflection, which resulted from moderate mass flow rates and reasonable angular velocities. Such instrumentation was usually quite expensive. In addition, the angular velocity of the conduit also had to be accurately measured and controlled in order to determine the mass flow rate of the fluid passing through the conduit as a function of the magnitude of the generated Coriolis forces.

A mechanical configuration and measurement technique which, among other things, avoids the need to measure and control the magnitude of the angular velocity of the conduit and also accurately and sensitively measures the Coriolis force is taught in U.S. Pat. No. Re. 31,450 (issued to Smith on Nov. 29, 1983 and hereinafter referred to as the '450 reissue patent). This patent discloses a mechanical configuration which incorporates a U-shaped flow tube, devoid of pressure sensitive joints, which has its open ends attached to opposite sides of a manifold. When so mounted, this flow tube is capable of being oscillated about an axis perpendicular to the side legs of the U-shaped tube. This axis is located near the tube-manifold interface and is situated in a plane in which the U-shaped tube lies at rest. This plane is hereinafter referred to as the midplane of oscillation. When fluid flows through the mounted U-shaped flow tube, the filled flow tube oscillates. These oscillations are sufficient to cause the free end of the flow tube to pass through the mid-plane of oscillation, and thereby generate a Coriolis force couple which elastically deflects the free end of the flow tube about an axis. This axis is located in the plane of the flow tube midway between and parallel to its side legs. By judicious design of the resonant frequency of the flow tube oscillating about this axis and another axis orthogonal thereto, a mechanical situation is created whereby the forces which oppose the generated Coriolis forces are predominantly linear spring forces. Consequently, through use of such a design, these spring forces cause one of the two side legs of the flow tube to pass through the mid-plane of oscillation before the other side leg does so. As such, the mass flow rate of the fluid that flows through the flow tube is proportional to the width of the time interval occurring between the passage of the respective side legs of the tube through the mid-plane of oscillation. This time interval and, hence, the mass flow rate of the fluid can be accurately measured using optical sensors as disclosed in the '450 reissue patent, or by using electromagnetic velocity sensors, as disclosed in U.S. Pat. No. 4,422,338 (issued to Smith on Dec. 27, 1983).

The '450 reissue patent also teaches the use of a spring arm which extends from the manifold along with the U-shaped flow tube. When this spring arm is sinusoidally driven in opposition to the U-shaped flow tube, the combination of spring arm and U-shaped flow tube operates as a tuning fork. This operation substantially attenuates undesirable vibrations occurring at the tube-manifold and spring arm-manifold interfaces. This attenuation is extremely advantageous for the following reason. In practice, these undesirable vibrations, often occur, particularly at the tube-manifold interfaces, with sufficient intensity to effectively mask tube movement caused by the small Coriolis forces and thereby introduce significant errors into the time interval measurements of the passage of the side legs of the U-shaped tube through the mid-plane of oscillation. Because the mass flow rate is proportional to the time interval measurements, these errors inject significant inaccuracies into the measured mass flow rate. Tuning fork operation substantially cancels these undesirable vibrations and thereby significantly increases measurement accuracy. In addition, reducing vibrations that occur at the manifold also decreases long term fatigue effects induced by vibrations that might otherwise occur on the meter mounting structure. The substitution of a second flow tube, having a similar configuration to the first flow tube, for the spring arm provides an inherently balanced tuning fork structure. The inherent symmetries in such a structure further reduce undesirable vibrations and thereby further increase measurement accuracy. This teaching has been recognized in the design of densimeters wherein measurements of the resonant frequency of filled flow tubes are used to determine the density of fluids in the tubes. See, for example, U.S. Pat. Nos. 2,635,462 (issued to Poole et. al. during April 1957) and 3,456,491 (issued to Brockhaus during July 1969).

The art also teaches the use of a serial double flow tube configuration in a Coriolis mass flow rate meter. Such a configuration is described in U.S. Pat. Nos. 4,127,028 (issued to Cox et. al. on Nov. 28, 1978); 4,192,184 (also issued to Cox et. al. on Mar. 11, 1980) and 4,311,054 (also issued to Cox et. al. on Jan. 19, 1982). Here, incoming fluid sequentially passes through one flow tube, then through an interconnecting conduit and lastly through another flow tube. Unfortunately, series type double flow tube meters possess an inherent drawback: since all the fluid must pass through two flow tubes instead of one, the fluid pressure drop across the meter is double that of a non-serial type flow meter. The one way to compensate for this doubled pressure drop is to double the pressure at which the incoming fluid is supplied to the meter. Unfortunately, this often entails increasing the pumping capacity of the entire fluidic system that supplies fluid to the meter.

An alternate configuration involving parallel flow tubes is disclosed in U.S. Pat. No. 4,491,025 (issued to Smith on Jan. 1, 1985 and hereinafter referred to as the '025 patent). Here, incoming fluid is evenly divided between and flows into parallel, illustratively two U-shaped, flow tubes rather than sequentially passing through two serially connected flow tubes. At the output end of each parallel flow tube, the fluid is combined in a drain manifold and from there exits the meter. The two flow tubes are then sinusoidally oscillated. As the fluid moves through both flow tubes, Coriolis forces are produced which alternately deflect adjacent legs of the tubes and, in turn, permit time interval measurements to be made in order to determine the mass flow rate of the fluid.

The parallel flow tube design provides significant advantages over the discussed prior art designs that utilize single or serially connected flow tubes. First, each parallel flow tube may be constructed with relatively thin walls which, in turn, provides increased sensitivity. As the wall thickness of a flow tube decreases, the mass and rigidity of the tube also decreases which, in turn, increases tube deflection caused by Coriolis forces. Increasing the deflection for a given mass flow rate advantageously increases the sensitivity of the meter. Second, parallel tube flow meters are, in general, operationally more stable than either single flow tube or serial flow tube meters. This occurs because the fluid flowing through both tubes results in a dynamically balanced pair of tuning fork tines, i.e., as the mass of one tine varies due to increased fluid density so will the mass of the other tine. Third, parallel flow tube meters are less sensitive to error-producing external vibrations and, hence, provide more accurate fluid flow measurements than do single tube or serial flow tube meters. This occurs because the time interval measurement sensors can be mounted on the flow tubes without a physical reference to any structure that is immutably fixed with respect to the mid-planes of oscillation for the tubes. Fourth, parallel flow tube meters exhibit less pressure drop across the entire meter than does a serial flow tube meter.

Unfortunately, difficulties exist with the parallel flow tube meter design. For one, fabrication of these meters is time consuming and hence costly. In addition, at high flow rates cavitation can occur in the fluid as it exits the meter. This, in turn, can cause vibrations that could lead to measurement inaccuracies.

Accordingly, a need exists in the art for a parallel path Coriolis mass flow rate meter which can be readily fabricated and which minimizes the possibility of cavitation.

SUMMARY OF THE INVENTION

The present invention overcomes the limitations of prior art parallel path Coriolis flow meters while retaining their numerous advantages.

In accordance with the present invention, the parallel flow tubes extend from a two piece manifold having a transition piece and a tube mounting block mounted thereto. The transition piece has a fluid-conducting passageway extending therethrough whose cross section smoothly varies from a first aperture at the inlet to a second aperture, different than the first, at a transition piece-tube mounting block interface. In the disclosed embodiment, the first and second apertures have round and oval cross sections, respectively. The tube mounting block has two parallel openings extending therethrough which are separated by an internal wall and which align the flow tubes in a parallel relationship. This internal wall has a smooth wedge shape so as to smoothly divide the fluid entering the flow tubes and smoothly combine the fluid exiting from the flow tubes. The parallel openings through the tube mounting block each incorporate an internal shoulder which serves as an alignment reference point for the ends of the flow tubes. This relationship is then maintained and a fluid-tight connection is provided by deforming the internal shoulder using heat to weld the tube ends and mounting block together. The tube mounting block also has an external geometry configured for reinforcement brazing of the flow tubes and welding of the transition piece thereto.

BRIEF DESCRIPTION OF THE DRAWINGS

The teachings of the present invention may be clearly understood by considering the following detailed description in conjunction with the accompanying drawings, in which:

FIG. 2 is a partial perspective view of the flow tube-manifold interface in a prior art parallel path Coriolis mass flow meter;

FIG. 3 is a top view of transition piece 110 or 110' used in the meter of FIG. 1;

FIG. 4 is a cross sectional view of transition piece 110 or 110' taken along section line B—B shown in FIG. 3;

FIGS. 5 and 6 are orthogonal cross sections of the passageway extending through each transition piece respectively along and perpendicular to section line A—A shown in FIG. 4;

To facilitate understanding, identical reference numerals have been used to denote identical elements common to the figures.

DETAILED DESCRIPTION

Figure 1:
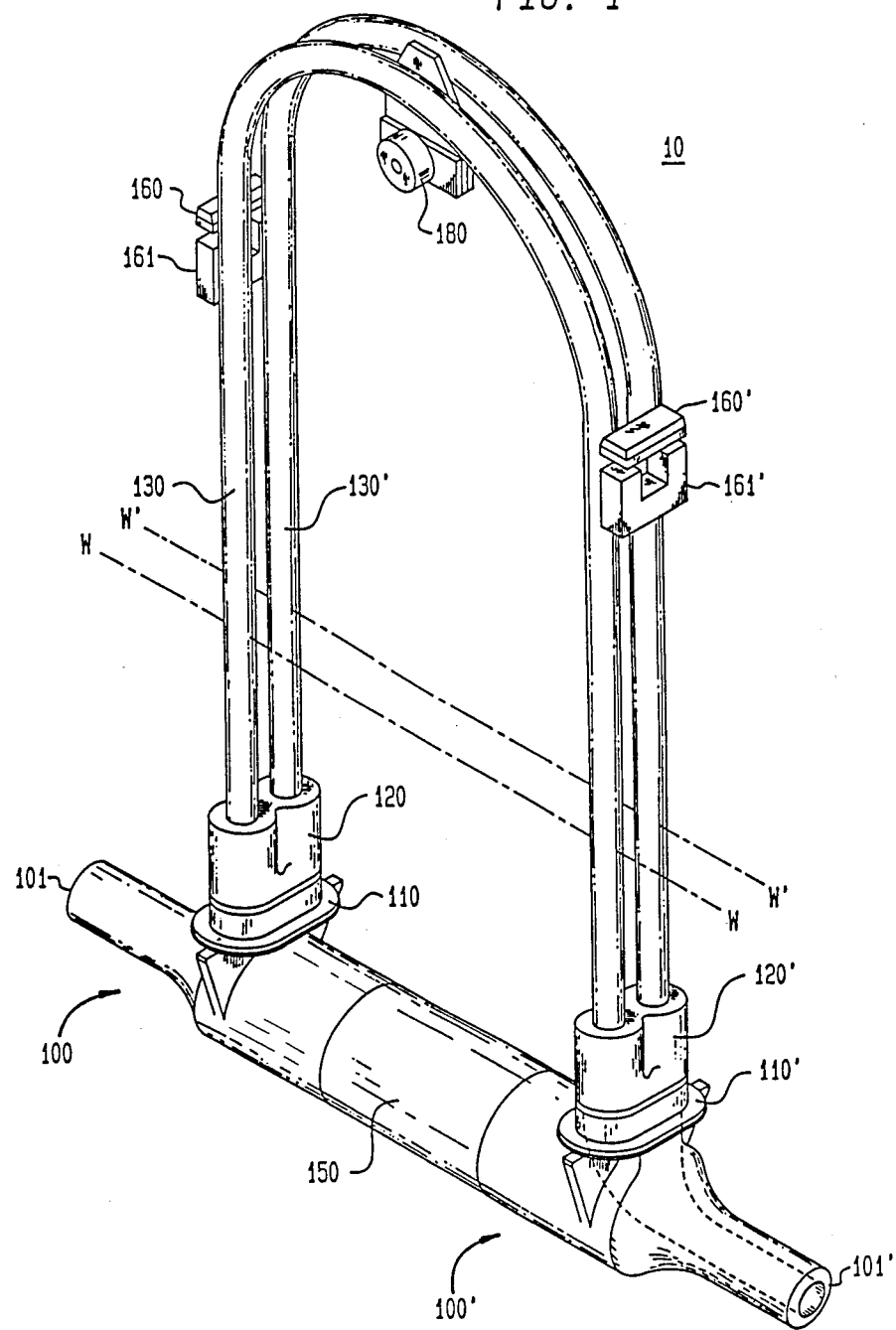
FIG. 1 is a perspective view of a parallel path Coriolis mass flow meter pursuant to the present invention.
Figure 7:
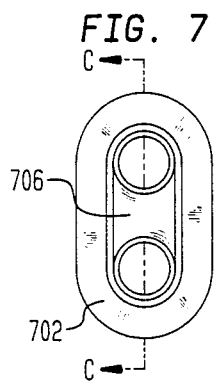
FIGS. 7, 8 and 9 are bottom, side and top views, respectively, of tube mounting block 120 or 120' used in the meter shown in FIG. 1.
Figure 10:
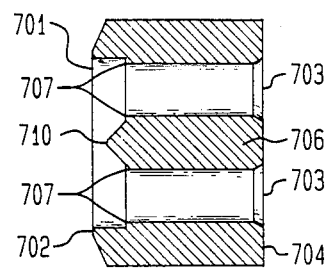
FIG. 10 is a cross section of the tube mounting block depicted in FIGS. 7, 8 and 9 and taken along section line C—C shown in FIG. 7.

FIG. 1 shows a parallel path Coriolis mass flowmeter 10 which incorporates the teachings of the present invention.

As shown, meter 10 includes a pair of manifolds 100 and 100'; tubular member 150; a pair of parallel flow tubes 130 and 130'; drive mechanism 180; a pair of coils 160 and 160'; and a pair of permanent magnets 161 and 161'. To overcome the limitations of the prior art, manifolds 100 and 100', respectively, include transition pieces 110 and 110' and tube mounting blocks 120 and 120', respectively. Tubes 130 and 130' are substantially U-shaped and have their ends attached to tube mounting blocks 120 and 120'. Both tubes are free of pressure sensitive joints.

With the side legs of tubes 130 and 130' fixedly attached to tube mounting blocks 120 and 120' and these blocks, in turn, fixedly attached to transition pieces 110 and 110', as shown in FIG. 1, a continuous closed fluid path is provided through meter 10. Specifically, when meter 10 is connected, via inlet end 101 and outlet end 101', into a conduit system (not shown) in which the mass flow rate of a fluid flowing therethrough is to be determined, fluid in the system enters the meter through an orifice in inlet end 101 of transition piece 110 and is conducted through a passageway therein having a gradually changing cross-section to an orifice in a second end adjacent to tube mounting block 120. The fluid then flows through tube mounting block 120 where it is evenly divided and conducted through tubes 130 and 130'. Upon exiting tubes 130 and 130', the fluid is recombined in a single stream within tube mounting block 120' and is thereafter conducted through an opening to transition piece 110'. Within transition piece 110', the fluid flows through a passageway having a gradually changing cross-section to an orifice in outlet end 101'. At end 101' the fluid reenters the conduit system. Tubular member 150 does not conduct any fluid. Instead, this member serves to axially align manifolds 100 and 100' and maintain the spacing therebetween by a pre-determined about so that these manifolds will readily receive mounting blocks 120 and 120' and flow tubes 130 and 130'.

U-shaped flow tubes 130 and 130' are selected and mounted so as to have substantially the same moments of inertia and spring constants about bending axes W—W and W'—W', respectively. These bending axes are perpendicular to the side legs of the U-shaped flow tubes 130 and 130', respectively, and are located near respective tube mounting blocks 120 and 120'. The U-shaped flow tubes extend outwardly from the mounting blocks in an essentially parallel fashion and have substantially equal moments of inertia and equal spring constants about their respective bending axes. Both of these flow tubes are sinusoidally driven in opposite directions about their bending axes but at essentially the same resonant frequency. In this manner, the flow tubes will vibrate in the same manner as do the tines of a tuning fork. Drive mechanism 180 supplies the sinusoidal driving forces to tubes 130 and 130'. Drive mechanism 180 can consist of any one of many well known arrangements, such as a magnet and a coil through which an alternating current is passed, for sinusoidally driving tubes 130 and 130' about their respective bending axes at their common resonant frequency.

With the fluid flowing through the flow tubes as described hereinabove and tubes 130 and 130' being sinusoidally driven in opposite directions, Coriolis forces will be generated along adjacent side legs of tubes 130 and 130' but in opposite directions. This phenomenon occurs because although the fluid flows through flow tubes 130 and 130' essentially the same parallel direction, the angular velocity vectors for the oscillating flow tubes are in opposite though essentially parallel directions. Accordingly, during one-half of the oscillation cycle of both flow tubes, the side legs attached to tube mounting block 120 will be twisted closer together by the generated Coriolis forces than will the side legs attached to tube mounting block 120'. During the next half-cycle, the generated Coriolis forces will twist the same side legs of these flow tubes further apart than the distance produced by just the oscillatory movement of the tubes.

During oscillation of the tubes, the adjacent side legs, which are forced closer together than their counterpart side legs, will pass through the mid-planes of oscillation before their counterparts. The time interval which elapses from the instant one pair of adjacent side legs pass through their mid-planes of oscillation to the instant the counterpart pair of side legs, i.e., those forced further apart, pass through their mid-planes of oscillation is proportional to the total mass flow rate of the fluid flowing through the meter. The reader is referred to the '025 patent for a far more detailed discussion of the principles of operation of parallel path Coriolis flow meters than that just presented and, specifically, for the teaching that the mass flow rate can be determined from measurement of such time intervals.

To measure this time interval, coils 160 and 160' are attached to either one of tubes 130 and 130' near their free ends and permanent magnets 161 and 161' are also attached near the free ends of the other one of the tubes. Magnets 161 and 161' are disposed so as to have coils 160 and 160' located in the volume of space surrounding the permanent magnets in which the magnet flux fields are essentially constant. With this configuration, the electrical signal outputs generated by coils 160 and 160' provide a velocity profile of the complete travel of the tube and can be processed in well-known fashion to determine the time interval and, in turn, the mass flow rate. The fact that the midplane of oscillation is used as a timing reference point should not be considered as a limitation. Any predetermined point in the velocity signal can be used as the reference for the time interval measurement or phase shift between the two signals.

The above-described time interval measurement has been used by prior art parallel flow mass flow meters. However, such meters possess inherent shortcomings relative to assembly and measurement precision which have been overcome by the use of transition pieces 110 and 110', and tube mounting blocks 120 and 120'. To understand these limitations of the prior art parallel flow meters, it is first necessary to briefly review their structure.

FIG. 2 shows a partial perspective view of an assembly, used in a parallel path Coriolis flow rate meter, for mounting the flow tubes to the inlet and outlet manifolds of the meter in a manner known in the art. In prior art meter 20, fluid enters the meter at a circular orifice in inlet end 271 of manifold 270 and is then conducted to two circular outlet orifices 280 formed in respective extensions of mounting surface 281. The fluid then flows through tubes 130 and 130', enters manifold 270' at circular orifices 280' formed in extensions of mounting surface 281' and thereafter exits the meter, via a circular orifice in outlet end 271' of manifold 270'. The use of substantially identical flow tubes 130 and 130', coupled with the design of manifolds 270 and 270', evenly divides the fluid between tubes 130 and 130', and then recombines the flow prior to the fluid exiting the meter. The mass flow rate of the fluid flowing through flow tubes 130 and 130' is measured in the same manner, as described hereinabove, for the present invention.

In assembling meter 20, the two manifolds are welded to a spacer tube 290 which fixes the distance between each manifold. In addition, in order to fix the spacing between tubes 130 and 130', as well as provide a rigid structural connection between these tubes and manifolds 270 and 270', the flow tubes are brazed to a pair of spacer bars 250 and 250'. Each spacing bar is brazed to the tubes at a predetermined distance inward from the ends of the tubes. This distance is approximately equal to three diameters of the flow tube. Because it is extremely difficult to weld the small mass of each flow tube to the large mass of each manifold, the ends of each flow tube are first tack welded to slip collar 260 which increases the mass of material at the end of each flow tube. Four such slip collars are required. Next, the assembly of tubes, spacer bars and slip collars are welded to manifolds 270 and 270' in order to provide a fluid-tight connection between circular orifices 280 and 280' and the flow tubes. After circumferentially welding the slip collars to the manifolds, the slip collars and flow tubes are torch brazed to fill any and all remaining small clearance gaps occurring therebetween. This brazing reinforces the welds appearing between the slip collars and manifolds so that these welds are able to withstand any oscillations of the tube that occur during normal operation of the meter. The brazing operation must be performed after the welding operation because otherwise the brazing material will melt during welding due to the proximity of the brazing material to the location of the weld between the manifold and slip collar. Moreover, induction brazing, which is substantially faster and more uniform than torch brazing, cannot be performed due to the size of the assembly and the location of the areas to be brazed.

Several other difficulties arise with the prior art parallel path Coriolis flow rate meter assembly shown in FIG. 2. For example, because of the close spacing of the four slip collar to manifold welds, it is difficult and time consuming to make the welds, particularly in the region between the two flow tubes, and to obtain X-ray inspection of each of these welds. In addition, a great deal of care must be taken to ensure and maintain proper alignment of the parallel flow tubes during the welding process. Finally, the design of manifolds 270 and 270′ may, in certain instances, cause cavitation, which could introduce errors into the measurement process. Specifically, as the fluid exits from flow tubes 130 and 130′ into manifold 270′, the fluid pressure markedly drops in certain locations of the manifold and can approach the vapor pressure of the fluid and allow the formation of vapor cavities. Dissolved gases and gas bubbles in the fluid provide nucleative points and assist in the onset of cavitation. In various downstream locations within the manifold and adjacent downstream process piping, the pressure of the fluid recovers. This, in turn, causes the vapor cavities to implode. Cavitation is more likely to occur at high flow rates and can be a source of random vibrations in the manifolds and the flow tubes. As such, cavitation can inject error into the measurement of the Coriolis force.

FIGS. 3-6 show the details of transition pieces 110 and 110′ appearing in FIG. 1 and used in the present invention. Each piece, formed of a unitary cast structure, conducts fluid, via passageway 303, between orifice 301 in end 101 or 101′ to orifice 302 in end 401. Orifices 301 and 302 advantageously have different cross sectional areas. As shown, orifice 302 has a substantially larger cross sectional area than orifice 301. The respective geometries of these orifices are different, with orifice 301 having a circular geometry and orifice 302 having an oval geometry. Furthermore, passageway 303 has a cross-section which gradually changes from the circular cross-section of orifice 301 to the oval cross-section of orifice 302. FIG. 5, which depicts a cross-sectional view of transition pieces 110 and 110′ taken along section line A—A shown in FIG. 4, and FIG. 6, which depicts a cross sectional view of transition pieces 110 and 110′ taken perpendicular to section line A—A, show this gradually changing passageway. By eliminating any abrupt change in the direction of the fluid flow, passageway 303 substantially reduces the likelihood that the pressure of the fluid will markedly drop anywhere within the transition piece. This, in turn, substantially eliminates the cavitation associated with the prior art design shown in FIG. 2 and, by doing so, advantageously removes a possible source of measurement inaccuracy. End 401 of each transition piece is substantially planar and has a slight bevel. The wall surrounding orifice 302 has a uniform thickness, as measured radially from the center of orifice 302. As will be discussed, this uniform thickness facilitates welding of transition pieces 110 and 110′ to respective tube mounting blocks 120 and 120′ (see FIG. 1).

FIGS. 7-10 show various detailed views of tube mounting blocks 120 and 120′ depicted in FIG. 1. Each mounting block has a fluid passageway which extends from opening 701 in end face 702 to a pair of openings 703 in end face 704. The cross-sectional area of opening 701 is substantially equal to that of orifice 302 in the transition piece shown in FIGS. 3-6, while the cross sectional area of opening 703 shown in FIGS. 7-10 is such that the latter opening can slidingly receive an end of flow tubes 130 or 130′. In addition, to facilitate welding each mounting block to its respective transition piece, the wall thickness surrounding opening 701 is substantially identical to the wall thickness surrounding orifice 302.

Each mounting block also includes internal wall 706 which acts as a flow splitter and specifically divides opening 701 into two circular openings 703. Wall 706 extends from end 704 and tapers down to a smooth wedge-shaped end 710. End 710 is recessed from end 702 to permit circumferential welding of each tube end to the mounting block assembly prior to circumferentially welding the mounting blocks 120 and 120′ to their respective transition pieces. In one mounting block, e.g. block 120, end 710 divides the fluid evenly between tubes 130 and 130′. End 710 appearing in the other mounting block, e.g. block 120′, recombines the fluid flowing from both flow tubes.

Figure 9:
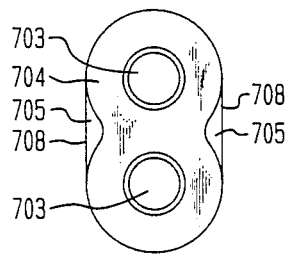
Figure 8:
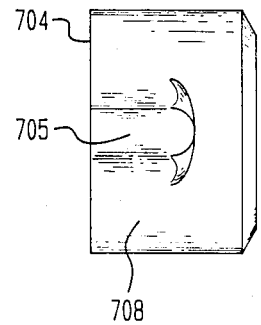

Each mounting block also incorporates shoulder 707 within each opening 703. This shoulder is located proximate to but recessed behind wall end 710 so as not to interfere with the flow dividing and combining function provided thereby. This shoulder not only serves as an alignment reference point for the end of tubes 130 and 130′ upon their insertion into openings 703 but also during welding, reaches its melting temperature before the remainder of the mounting block does, i.e. the temperature of the remainder of the mounting block remains below its melting point when the shoulder begins to melt, so as to advantageously become a sacrificial member in circumferentially welding the tubes in place and providing a fluid-tight connection between the flow tubes and the mounting block. Although a shoulder is shown the mounting block can be provided with a rib or other projection having a small mass in comparison to the mass of the wall of the mounting block which can serve as the sacrificial member for the welds. To reinforce this weld and ensure a fluid-tight during the tube oscillation occurring during meter operation, brazing material 1100 (see FIG. 11) is added to fill any small voids occurring between the tubes and mounting blocks. To facilitate brazing the mounting blocks to each tube, grooves 705 are formed in external surfaces 708 in the common region between the two openings 703. These grooves extend from end 704 toward end 702 and terminate at positions, on external surfaces 708, which are substantially uniform over the length of the mounting block wherein the block and inserted tubes are coaxial. Without grooves 705, the common wall region between the two openings 703 would be thicker in cross-section than the other portions of the walls. A uniform block thickness in the common region minimizes differential shrinkage between the brazing material and mounting block after brazing. The resulting wall geometry, as shown in FIG. 9 has a "FIG. 8" appearance.

Figure 11A:
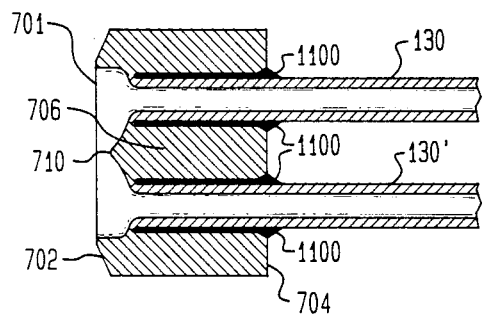
FIGS. 11A and 11B are cross sections of the tube mounting block shown in FIG. 10 after assembly of parallel flow tubes 130 and 130' depicted in FIG. 1.
Figure 11B:
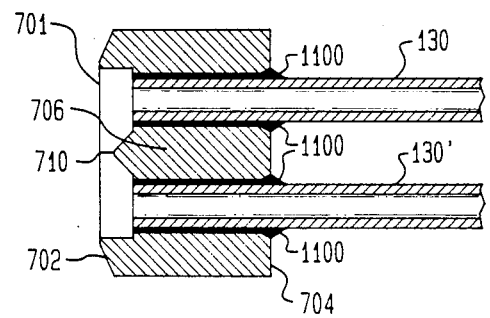

FIG. 11A shows the assembly of one end of flow tubes 130 and 130' mounted to a mounting block using circumferential welds at the ends of the tubes. After one end of each flow tube is inserted to a position where that end is substantially flush with shoulder 707, heat is applied to the block to melt this shoulder. Once this shoulder melts, it provides a circumferential weld between the tube end and the block. This weld, which maintains the tubes in their aligned positions and provides a fluid-tight connection, is then reinforced by brazing material 1100 which fills any and all remaining voids then occurring between the mounting block and tube. After this subassembly is completed, end faces 702 of each mounting block are welded to end faces 401 (see FIGS. 3–6) of each associated transition piece using a single circumferential weld. FIG. 11B illustrates the assembly of one end of flow tubes 130 and 130' mounted to a mounting block using brazing only. The assembly procedure is essentially the same as previously described for FIG. 11A except that the circumferential welds at the ends of the tubes are omitted and the tubes are fixed using only brazing. The joints between the tubes and the mounting blocks are known as wetted brazed joints. This is because with this type of joint the braze material is exposed or wetted by the process fluid flowing through the meter. The braze material is not wetted by process fluid with the welded joints depicted in FIG. 11A.

Several additional advantages of the present invention over the prior art mounting assembly shown in FIG. 2 will now be noted. First, prior to forming the circumferential weld between the mounting blocks and transition pieces, the mounting block and flow tube subassembly can be brazed using vacuum or induction brazing. These brazing processes, which are significantly faster and more uniform than torch brazing, can now be used. For induction brazing, the open ends of the subassembly are small enough to be easily inserted within an induction coil. For vacuum brazing only the flow tube and mounting block subassembly not the entire meter need to be placed into the vacuum furnace. This allows more subassemblies to be vacuum brazed in a single operation than if the entire meter had to be placed in the furnace. In addition, because the ends of the flow tubes are recessed from the circumferential welds existing between the mounting blocks and the transition pieces, the brazing material is removed from the high temperature welding area. As a result, brazing can be performed prior to welding. Furthermore, the single circumferential weld existing between each transition piece and each mounting block is far more accessible for X-ray inspection than are the welds that exist between each flow tube and the manifold in the prior art assembly shown in FIG. 2. Overall, an assembly constructed in accordance with the present invention eliminates two time consuming welds, four brazements, spacer bars 250 and 250', and four slip collars 260 from the assembly shown FIG. 2, thereby advantageously lowering part count, manufacturing time and hence cost. Lastly, as noted, by substantially eliminating cavitation, the present invention enhances the precise mass flow measurements obtainable through the prior art assembly.

Clearly, those skilled in the art readily appreciate that, although the disclosed embodiment utilizes U-shaped flow tubes, flow tubes of almost any size and shape may be used as long as the tubes can be oscillated about an axis to establish a non-inertial frame of reference for fluid passing therethrough. By way of non-limiting example, S-shaped tubes or looped tubes can be used with the invention. In addition, although fluid has been shown as entering manifolds 100 and 100' in a direction substantially perpendicular to the flow tubes, each manifold can be adapted to receive and discharge fluid in a direction substantially parallel to or at any angle to the ends of the flow tubes. Lastly, although the meter has been shown as containing only two parallel flow tubes, more than two parallel flow tubes—such as three, four or even more—may be used provided that the geometry of the mounting block and the end of transition piece that connects to an end of the mounting block is appropriately changed to accommodate the additional parallel flow tubes.

While the present invention has been disclosed in reference to a particular embodiment, many varied arrangements may be made by those skilled in the art without departing from the teachings of the invention.

What is claimed is:

1. A Coriolis meter for measuring mass flow rate of a fluid comprising:
    a pair of flow tubes, said flow tubes being substantially free of pressure sensitive joints;
    inlet and outlet manifolds for respectively conducting fluid into and out of said flow tubes and being connected to respective ends of said flow tubes, wherein said inlet manifold divides said fluid flowing from an inlet orifice, of said Coriolis meter and located in said inlet manifold, between said flow tubes and wherein said outlet manifold combines said fluid exiting from said flow tubes and flowing into an outlet orifice, of said Coriolis meter and located in said outlet manifold, each of said manifolds comprising:
        a transition piece having first and second ends and first and second orifices respectively disposed therein, and a passageway between said first and second ends, said fluid being capable of flowing from said first orifice to said second orifice in said inlet manifold and from said second orifice to said first orifice in said outlet manifold, wherein said passageway has a cross-sectional area that gradually changes from a first value at said first orifice to a second value, different from the first value, at said second orifice;
        a mounting block formed of a weldable material and having oppositely situated first and second surfaces thereon, said mounting block being disposed on said transition piece with the first surface in abutting contact with said second end, said mounting block also having a first opening inwardly extending from said first surface which at said first surface is substantially identical in cross-sectional area with that of said second orifice and is aligned with said second orifice, said mounting block also having a pair of second openings inwardly extending from said second surface to said first opening and in fluid communication therewith, each of said second openings having slidingly received an associated end of one of said flow tubes, said mounting block further comprising:
            a projection formed in said mounting block and radially extending inward into a corresponding one of each of said second openings so as to locally reduce the diameter of said corresponding second opening, wherein each of said projections is located at a pre-defined depth from said first surface such that each of said projections abuts against an external wall of a corresponding one of said flow tubes and wherein each of said projections also has a smaller mass than that of the remainder of said mounting block whereby during a welding operation each of said projections is capable of deforming before the remainder of said mounting block deforms in order to provide a substantially fluid-tight circumferential weld between the end of the corresponding flow tube and said mounting block;

said apparatus further comprising:
means for vibrating each of the flow tubes in a pre-determined sinusoidal pattern;
means for sensing deflection of said flow tubes caused by Coriolis forces induced by the fluid flowing through said flow tubes; and
means operative in response to said sensed deflection for determining mass flow rate of the fluid.

2. The meter of claim 1 further comprising a brazed joint between at least one of said flow tubes and said mounting block.

3. The meter of claim 1 wherein said flow tubes have a shape selected from a group of shapes consisting of a U, a S, or a loop.

4. The meter of claim 3 wherein said sensing means comprises means for measuring a time interval occurring between the passage of a first pair of adjacent side legs of said flow tubes through a predetermined point in its oscillation and the passage of a second pair of adjacent side legs of said flow tubes through said predetermined point in its oscillation, whereby said mass flow rate is determined from said measured time interval.

5. The meter of claim 1 wherein said first and second orifices of said transition piece have circular and oval cross sectional geometries, respectively.

6. The meter of claim 1 wherein said second end of said transition piece has a wall surrounding said second orifice of substantially uniform thickness measured radially from said second orifice.

7. The meter of claim 6 wherein said first surface and said second end have substantially identical cross-sections.

8. The meter of claim 1 wherein said mounting block has an internal wall between said second openings which extends from said second surface to a pre-determined position recessed from said first surface so as to act as a flow splitter.

9. The meter of claim 8 wherein said wall tapers to a wedge-shaped recessed end at said pre-determined position.

10. The meter of claim 1 wherein said mounting block has a groove in each of two external substantially parallel surfaces between said pair of second openings, each groove extending from said second surface to a location aligned with said position.

11. The meter of claim 1 wherein said vibrating means comprise a magnet and a coil.

12. The meter of claim 1 wherein said sensing means comprise a magnet and a coil.

13. In a parallel path Coriolis flow meter, a manifold for conducting fluid to or from a pair of flow tubes utilized in said meter, said manifold comprising:
a transition piece having first and second ends and first and second orifices respectively disposed therein, and a passageway between said first and second ends, wherein said passageway has a cross-sectional area that gradually changes from a first value at said first orifice to a second value, different from the first value, at said second orifice;
a mounting block formed of a weldable material and having oppositely situated first and second surface thereon, said mounting block being disposed on said transition piece with the first surface in abutting contact with said second end, said mounting block also having a first opening inwardly extending from said first surface which at said first surface is substantially identical in cross-sectional area with that of said second orifice and is aligned with said second orifice, said mounting block also having a pair of second openings inwardly extending from said second surface to said first opening and in fluid communication therewith, each of said second openings having slidingly received an associated end of one of said flow tubes, said mounting block further comprising:
a projection formed in said mounting block and radially extending inward into a corresponding one of each of said second openings so as to locally reduce the diameter of said corresponding second opening, wherein each of said projections is located at a pre-defined depth from said first surface such that each of said projections abuts against an external wall of a corresponding one of said flow tubes and wherein each of said projections also has a smaller mass than that of the remainder of said mounting block whereby during a welding operation each of said projections is capable of deforming before the remainder of said mounting block deforms in order to provide a substantially fluid-tight circumferential weld between the end of the corresponding flow tube and said mounting block.

14. The meter of claim 13 further comprising a brazed joint between at least one of said flow tubes and said mounting block.

15. The manifold of claim 13 wherein said second end of said transition piece has a wall surrounding said second orifice of substantially uniform thickness measured radially from said second orifice.

16. The manifold of claim 15 wherein said first surface and said second end have substantially identical cross-sections.

17. The manifold of claim 13 wherein said mounting block has an internal wall between said second openings which extends from said second surface to a pre-determined position recessed from said first surface so as to act as a flow splitter.

18. The manifold of claim 17 wherein said wall tapers to a wedge-shaped recessed end at said pre-determined position.

19. The manifold of claim 13 wherein said mounting block has a groove in each of two substantially parallel external surfaces between said pair of second openings, each groove extending from said second surface to a location aligned with said position.

20. The manifold of claim 13 wherein said first and second orifices of said transition piece have circular and oval cross-sectional geometries, respectively.

* * * * *